United States Patent Office 3,075,133
Patented Jan. 22, 1963

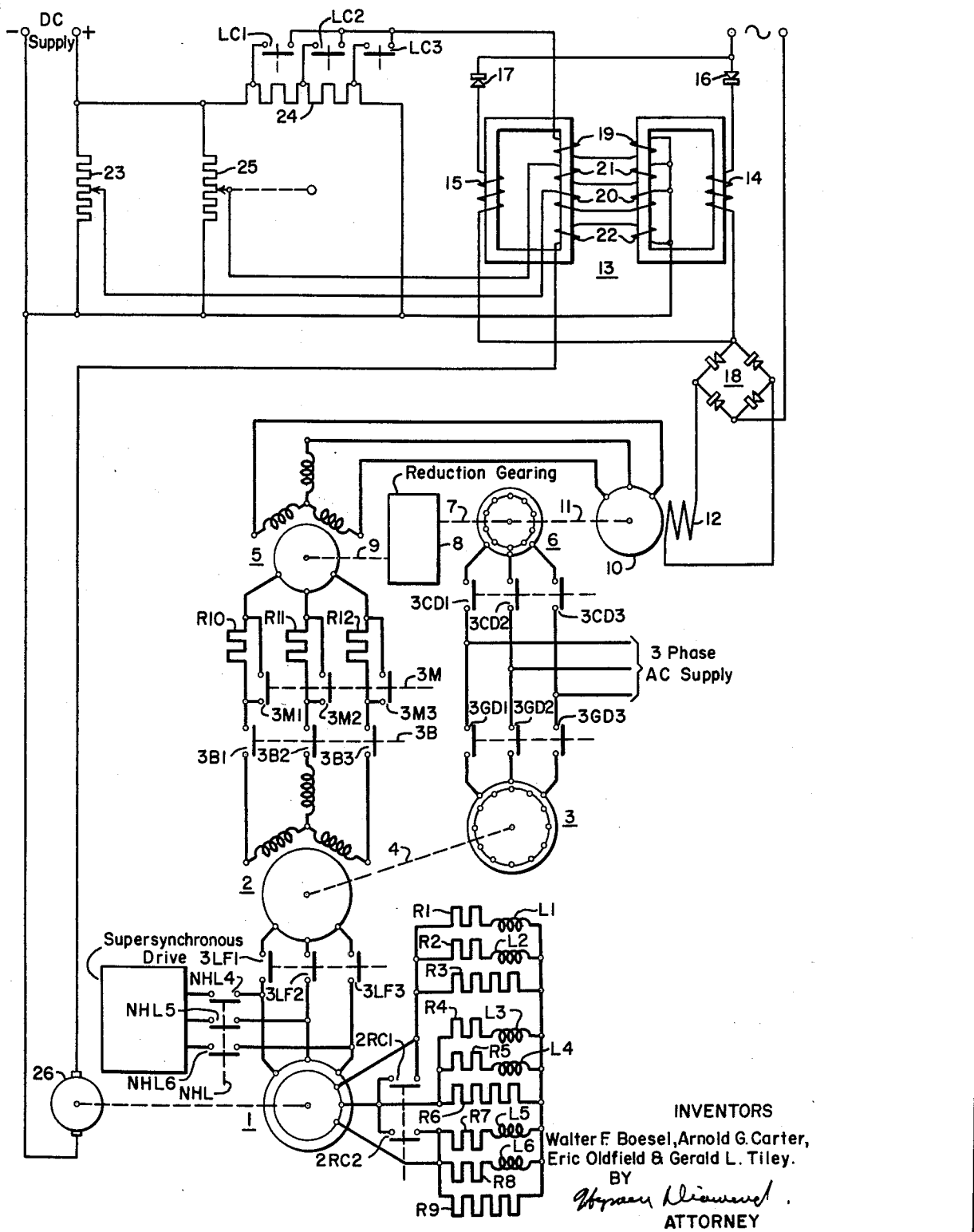

3,075,133
MOTOR CONTROL SYSTEM
Walter F. Boesel, Fruitland, Ontario, Arnold G. Carter, Hamilton, Ontario, and Eric Oldfield and Gerald L. Tiley, Burlington, Ontario, Canada, assignors to Canadian Westinghouse Company, Limited, Hamilton, Ontario, Canada
Filed June 15, 1959, Ser. No. 820,339
Claims priority, application Canada July 3, 1958
7 Claims. (Cl. 318—148)

Our invention relates to motor control systems and in particular means for controlling alternating current motors.

In the operation of wound rotor induction motors it is common practice to vary the resistance in the rotor as the motor is brought into synchronism with the supply. Variation in the resistance in the rotor, however, requires contactors which must be capable of operating at high currents if the motor is to operate at heavy loads. Operation of this type becomes particularly important in the case where the induction motor is driving an overhauling load. As a result of the overhauling condition, the rotor may tend to run at super-synchronous speed. Under some circumstances the rotor may be permitted to run at super-synchronous speeds for a certain length of time and then retarded, by bringing the rotor down to synchronous speed. To accomplish this the rotor is loaded down through resistors and eventually the resistors are short-circuited and the rotor then tends to lock into synchronism with the supply. One could short-circuit the rotor immediately but under such a mode of operation the torque retarding the load would be proportional to speed, and for this reason it is more desirable that retardation commence with a certain resistance in the rotor circuit and this resistance be reduced in steps to provide a substantially constant-torque characteristic. Another circumstance in which the motor is operating at super-synchronous speed in a two frequency A.C. system such as that described in Patent 2,963,114, granted December 6, 1960 to E. Zucker et al., which is incorporated herein by reference, where the motor is capable of operating at two speeds in synchronism with two separate and different A.C. supplies. If the motor is running at essentially synchronous speed with the higher frequency supply and it is desired to retard the motor and cause it to run at the essentially synchronous speed with respect to the low frequency supply, the low frequency supply is applied to the stator of the motor and the rotor resistance is controlled in such a manner as to produce an essentially constant retarding torque.

As was previously indicated, however, this mode of operation requires contactors in the rotor circuit which must be capable of carrying the full load current. It also must be designed to operate in a series of steps, and, therefore, although the torque may be essentially constant, it must vary in a step function.

In motor control systems of the type described in the foregoing patent, it may also be desirable to ensure that during retarding the load to the low frequency synchronous speed indiscriminate application of high retarding torques without consideration of the other factors is undesirable. For example, if the system is used for operating a friction hoist, the torque should be so high as to produce rope slip. This could be accomplished by a voltage limit or by insertion of inductance in the rotor or stator but both of these expedients have disadvantages, the former since voltage limiting could operate at time when it is a disadvantage, the latter for the same reasons indicated previously with reference to the control of rotor resistance.

In the latter type of control system, it may also be desirable to bring the motor to a complete stop from the low frequency synchronous speed. This may be done mechanically but it would be advantageous if electrical braking could be used to assist the mechanical braking.

It is an object of this invention to provide a control system for a wound rotor induction motor which permits the rotor to be brought smoothly and with uniform torque to essentially synchronous speed without mechanical contactors capable of controlling the full rotor current in the rotor circuit.

This and other objects are attained in accordance with this invention by inserting in the rotor circuit impedances which comprise a suitable combination of resistance and inductance so that the rotor torque is essentially constant as the rotor approaches synchronous speed. The potential applied to the stator of the motor is varied in accordance with the desired rotor speed as compared to the actual rotor speed.

To limit the torque a resistance may also be inserted in the circuit, but in the system described utilizing a low-frequency generator, the resistances may be inserted in the field of the generator with a consequent reduction in the size of contactor required to control the resistances. Further in such a system when the motor is to be brought to a standstill opening of the generator field will result in a rapid braking of the motor, an operation comparable to "suiciding" a Ward Leonard. This mode of operation is, of course, only possible when the field of the generator is available to the control circuit, that is in cases where the motor supply is locally and individually generated.

A clearer understanding of our invention may be had from consideration of the following specification and drawing. The single FIGURE of the drawing is a schematic diagram of motor control system utilizing our invention wherein the alternating current is supplied with a low frequency alternating current for retarding purposes.

Considering this figure in detail, there is shown the control motor 1 which is a wound rotor induction motor. In the rotor circuit of the motor there are shown various resistances and inductances in series. These inductances are designated L1 to L6 and the resistances are designated R1 to R9. Also shown in the rotor circuit are two rotor contactors for short-circuiting the rotor winding designated 2RC1 and 2RC2, respectively. The stator of the induction motor is supplied with a low frequency A.C. supply from low frequency generator 2 through contactors 3LF1, 3LF2 and 3LF3 from the rotor of the low frequency generator.

The low frequency generator 2 is driven by a frequency driving motor 3 through shaft 4. The field of the low frequency generator is supplied from the low frequency converter 5 through contacts 3B1, 3B2 and 3B3 of contactor 3B and resistors R10, R11 and R12, or contacts 3M1, 3M2 and 3M3 of contactor 3M which are respectively in parallel with the resistors. This generator is driven by converter driving motor 6, which is an ordinary induction motor, through shaft 7, gear reducer 8 and shaft 9. Driving motors 3 and 6 are coupled to a three phase supply through contacts 3GD1, 3GD2 and 3GD3 and 3CD1, 3CD2 and 3CD3, respectively. The field of low frequency generator 5 is supplied from the exciter alternator rotor 10.

The exciter alternator is also driven by the converter motor 6 through shaft 11. The field 12 of the exciter alternator is supplied from magnetic amplifier 13. This magnetic amplifier is a conventional magnetic amplifier provided with two controlled windings 14 and 15 which are supplied with alternating current from a suitable supply through rectifiers 16 and 17, respectively, and in common through a bridge rectifier 18. The output of the magnetic amplifier is taken from the other two terminals of the bridge rectifier 18 and applied directly to field 12. The magnetic amplifier also includes a control winding 19, a bias winding 20 and two further control windings 21 and 22. A suitable bias is applied to the bias winding 20 from D.C. supply through potentiometer 23. One control voltage for the magnetic amplifier is applied to control winding 19 through contactors LC1, LC2 and LC3. The potentials applied through this control winding are derived from taps on a resistor 24.

A further control voltage is applied to the magnetic amplifier control winding 21 from the potentiometer 25 which is across the D.C. supply. The control potential for control winding 22 is obtained from tachometer generator 26 which is mechanically coupled to the controlled motor 1 and produces a voltage proportional to the speed of motor 1.

It will be understood that one side of all the control windings 19, 20, 21 and 22 are shown as being returned to a common point. As a matter of convenience all control signals are derived with respect to this common point which is shown as the minus lead of the D.C. supply.

In considering the actual mode of operation of the sytem, it will be assumed that the motor 1 has been driven from the Super-Synchronous Drive and has been operating at a much greater frequency than that of the generator 2 (see application 722,734 where the drive motor is operated at 60 cycles between landings and at 3 or 4 cycles as the hoist approaches a landing). The rotor of motor 1 is then turning at a super-synchronous frequency with respect to the frequency supplied by the low frequency generator. The Super-Synchronous Drive may be the available commercial three-phase supply to which motors 3 and 6 are connected. The motor 1 is adapted to be connected to the Super-Synchronous Drive through contacts NHL4, NHL5, NHL6 of a contactor NHL.

Let us now assume it is desired to retard the rotor in order to retard the load to bring the rotor to synchronous frequency with respect to the low frequency supply. Assuming contactors 3B, 3GD and 3CD are closed and the driving motors for the converter and the low frequency generator to be operating, the low frequency generator will be producing an output of the desired frequency whose voltage is dependent upon the control voltage applied to the exciter alternator field 12. If contacts NHL4, NHL5, NHL6 are now opened and contacts 3LF1, 3LF2 and 3LF3 closed, this low frequency voltage is applied to the stator of controlled motor 1. The rotor of this motor will then try to pull into synchronous speed in synchronism with the field produced by the supply from the low frequency generator. The torque produced, however, will be dependent upon the values of R1 to R9 and L1 to L6.

The frequency generated in the rotor of motor 1 will, of course, be dependent upon the actual speed of the rotor, and assuming that the rotor is turning at the higher frequency synchronous speed, the frequency of the current produced in the rotor will be approximately the high frequency minus the lower frequency. As the rotor slows, however, and approaches the lower frequency, then, of course, the frequency in the rotor will approach the low frequency, until when the rotor is rotating in synchronism with the low frequency field the current will alternate at slip frequency if any exists or at zero frequency if the rotor is in exact synchronism with the field. It will be understood, therefore, that the impedances in the rotor are proportional to frequency, and therefore, the current in the rotor is proportional to frequency and that is possible to arrange L1 and L2, L3 and L4, L5 and L6, in such a manner that the torque produced by the motor is substantially constant over the whole frequency range normally produced in the rotor circuit. At the same time, in order to stabilize the torque the voltage applied to the control motor field may be controlled by the exciter alternator field 12.

The magnetic amplifier 13 is supplied with a bias voltage in the bias winding 20 from potential 23, and this bias is adjusted to produce the desired operating characteristic of the magnetic amplifier. A further control voltage is applied to control winding 19 through contractors LC1, LC2 and LC3 which set up a pattern or signal proportional to the load. While only three contacts are shown, any number of load contacts may be used in the circuit, it being understood that the control of these load contacts is performed by a circuit which operates certain of the contacts in accordance with the load on the motor.

One particular method of obtaining such a control for contacts LC1, LC2 and LC3 is shown in the previously referred to patent. However, any other method may be utilized which permits the closing of certain contacts in proportion to the load on the motor 1. A further control voltage is derived from the tachometer generator. A voltage produced by the tachometer generator 26 is proportional to the speed of motor 1. A further voltage is applied to control winding 21. This voltage is derived from potentiometer 25. The slider of potentiometer 25 is shown as being mechanically intercoupled with some other device, in fact, the slider may be mechanically controlled in accordance with the desired speed of motor 1 during the particular portions of the travel of the load driven by motor 1.

In the particular case described in the previously referred to patent, the motor was driving a hoist and under some conditions the hoist was required to have a particular speed displacement characteristic. This could be accomplished by permitting the load through some mechanical intercoupling to drive the slider of potentiometent 25. For example, on approaching a stopping point the load could be arranged to strike a lever which in turn operated the slider of potentiometer 25 and caused the speed characteristic to vary during the last few feet or inches of travel of the load.

All the control signals referred to produce an effect on the output of the magnetic amplifier, therefore, the field 12 of the exciter alternator 10 carries a current which is proportional to all the various signals referred to. By properly proportioning these various signals it is possible to cause the motor 1 to be retarded with substantially constant torque and follow a particular speed displacement characteristic as required and at the same time ensure that this characteristic is constant irrespective of the load.

As long as contacts 3M1, 3M2 and 3M3 of contactor 3M are open, the resistance in the field of LF generator restricts the current and limits the available torque. To this end the resistors are left in circuit during the retardation from super-synchronous to synchronous speed and thus act to limit the retarding force. During motoring the resistors are shorted out by closing contactor 3M. When it is desired to further retard the load and bring the driving motor to a stop, contactor 3B is opened. The air gap flux of the motor dies down more slowly than that of the LF generator and hence current will be forced to flow from the induction motor to the low frequency generator.

At any time that it is desired to lock the rotor into synchronous speed either under driving or motoring conditions, it will be advisable to short circuit the rotor by closing contactor 2RC that bears contacts 2RC1 and 2RC2.

It will be understood that specific values of the various components including the effect of the various windings of the magnetic amplifier must of necessity vary in accordance with the application and while the system has been described generally in relation to a two frequency supply for a single motor, it will be understood that it could also be applied to other forms of overhauling loads where the rotor speed exceeds its synchronous speed.

The embodiment of the invention in which an exclusive property or privilege is claimed are defined as follows:

1. A motor control system including a wound rotor induction motor including a polyphase field winding and a wound rotor, a polyphase source of alternating current power for said field winding for producing a rotating field, means to drive said rotor at a speed super-synchronous to said rotating field, means to apply said alternating power to said field and thereby produce a retarding torque on said rotor, impedances in said rotor circuit to limit the current in said rotor to such a value that the retarding torque is essentially constant irrespective of the rotor speed throughout the normal range of speeds of operation of said rotor from said super-synchronous speed to essentially synchronous speed, said impedances in said rotor circuit including inductances and resistors in specifically selected combination.

2. A motor control system including a wound rotor induction motor having a field winding and a rotor, a low frequency generator including a field, for energizing said field winding of said motor to produce a rotating electrical field, means to drive said motor at a speed super-synchronous with reference to said rotating field, means to connect said low frequency generator to said field winding of said motor to produce a retarding torque on said rotor, a combination of resistance and inductance in the circuit of said wound rotor of such value that the retarding torque produced is essentially constant throughout the normal operating speed range of said rotor from super-synchronous speed to essentially synchronous speed, resistors in the field of said generator and means to open circuit the field of said generator and means to short-circuit said combination of resistance and inductance in said rotor circuit.

3. A motor control system including a wound rotor induction motor including a polyphase field winding and a wound rotor, a polyphase source of alternating current power for said field winding for producing a rotating field, means to drive said rotor at a speed super-synchronous to said rotating field, means to apply said alternating power to said field and thereby produce a retarding torque on said rotor, impedances in said rotor circuit, said impedances being variable in dependence upon the frequency of the current in said rotor circuit and, responsive to the variation in said impedance, limiting the current in said rotor to such a value that the retarding torque is essentially constant irrespective of the rotor speed throughout the normal range of speeds of operation of said rotor from said super-synchronous speed to essentially synchronous speed.

4. A motor control system including a wound rotor induction motor including a polyphase field winding and a wound rotor, a controllable polyphase source of alternating current power for said field winding for producing a rotating field, means to drive said rotor at a speed super-synchronous to said rotating field, means to apply said alternating power to said field and thereby produce a retarding torque on said rotor, impedances having frequency responsive impedance characteristics in said rotor circuit to limit the current in said rotor in accordance with the frequency of said current to such a value that the retarding torque is essentially constant irrespective of the rotor speed throughout the normal range of speeds of operation of said rotor from said supersynchronous speed to essentially synchronous speed.

5. A motor control system as claimed in claim 4 wherein said source of alternating current comprises an alternator including a field and means to control the current in the field of said alternator.

6. A motor control system as claimed in claim 4 wherein said source of alternating current comprises an alternator including a field and means to control the current in the field of said alternator and also wherein said means to control the current in the field of said alternator includes means to interrupt the continuity of the circuit including said field.

7. A motor control system including a wound rotor induction motor, a low frequency generator, including a field, for energizing the field of said motor to produce a rotating electrical field, means to drive said motor at a speed supersynchronous with reference to said rotating field, means to connect said low frequency generator to said motor field to produce a retarding torque on said rotor, a combination of resistance and inductance in the rotor circuit of said wound rotor of such value that the retarding torque produced by a given voltage of the low frequency connected to said motor field is essentially constant throughout the normal operating speed range of said rotor from supersynchronous speed to essentially synchronous speed, and means to control the voltage output of said low frequency generator.

References Cited in the file of this patent

UNITED STATES PATENTS

| | | |
|---|---|---|
| 1,598,192 | Seymour et al. | Aug. 31, 1926 |
| 1,709,134 | Lewis | Apr. 16, 1929 |
| 1,759,551 | Greenleaf et al. | May 20, 1930 |
| 1,809,963 | Cordes | June 16, 1931 |
| 2,963,114 | Zucker et al. | Dec. 6, 1960 |

FOREIGN PATENTS

| | | |
|---|---|---|
| 1,032,371 | Germany | June 19, 1958 |